(12) United States Patent
Yuge et al.

(10) Patent No.: US 11,552,295 B2
(45) Date of Patent: Jan. 10, 2023

(54) LITHIUM-MANGANESE COMPOSITE OXIDE, AND METHOD FOR PRODUCING SAME, AND POSITIVE ELECTRODE MATERIAL, POSITIVE ELECTRODE AND LITHIUM ION SECONDARY BATTERY USING SAME

(71) Applicant: NEC CORPORATION, Tokyo (JP)

(72) Inventors: Ryota Yuge, Tokyo (JP); Mitsuharu Tabuchi, Osaka (JP); Kyousuke Doumae, Fukui (JP); Hideka Shibuya, Fukui (JP)

(73) Assignee: NEC CORPORATION, Tokyo (JP)

( * ) Notice: Subject to any disclaimer, the term of this patent is extended or adjusted under 35 U.S.C. 154(b) by 57 days.

(21) Appl. No.: 17/167,141

(22) Filed: Feb. 4, 2021

(65) Prior Publication Data

US 2021/0167382 A1    Jun. 3, 2021

Related U.S. Application Data

(62) Division of application No. 16/482,126, filed as application No. PCT/JP2018/003215 on Jan. 31, 2018, now abandoned.

(30) Foreign Application Priority Data

Jan. 31, 2017 (JP) .................. 2017-015472
Dec. 28, 2017 (JP) .................. 2017-253731

(51) Int. Cl.
*H01M 4/525* (2010.01)
*C01G 53/00* (2006.01)
(Continued)

(52) U.S. Cl.
CPC .......... *H01M 4/525* (2013.01); *C01G 53/006* (2013.01); *H01M 4/505* (2013.01); *H01M 10/0525* (2013.01); *H01M 2004/028* (2013.01)

(58) Field of Classification Search
CPC ...................................................... H01M 4/525
See application file for complete search history.

(56) References Cited

U.S. PATENT DOCUMENTS

| 6,203,946 B1 | 3/2001 | Barker et al. |
| 10,622,678 B2 | 4/2020 | Maeda et al. |

FOREIGN PATENT DOCUMENTS

| JP | 2006-036621 A | 2/2006 |
| JP | 3940788 B2 | 7/2007 |

(Continued)

OTHER PUBLICATIONS

Mitsuharu Tabuchi et al., "Stabilization of tetra- and pentavalent Fe ions in Fe-substituted Li2MnO3 with layered rock-salt structure", Journal of Applied Physics, 2008, pp. 043909-1-043909-10, vol. 104.

(Continued)

*Primary Examiner* — William D Young
(74) *Attorney, Agent, or Firm* — Sughrue Mion, PLLC

(57) ABSTRACT

A lithium-manganese composite oxide containing a lithium-iron-manganese composite oxide represented by the composition formula. $Li_{1+x-w}(Fe_yNi_zMn_{1-y-z})_{1-x}O_{2-\delta}$, where $0<x<1/3$, $0\leq w<0.8$, $0<y<1$, $0<z<0.5$, $y+z<1$, and $0\leq\delta<0.5$, in which at least in a state of charge of a lithium ion battery using the lithium-manganese composite oxide as a positive-electrode active material, at least some of iron atoms are pentavalent.

8 Claims, 1 Drawing Sheet

(51) Int. Cl.
*H01M 4/505* (2010.01)
*H01M 10/0525* (2010.01)
*H01M 4/02* (2006.01)

(56) References Cited

FOREIGN PATENT DOCUMENTS

| | | |
|---|---|---|
| JP | 2008-127211 A | 6/2008 |
| JP | 2010-153122 A | 7/2010 |
| JP | 4963059 B2 | 6/2012 |
| JP | 2013-212959 A | 10/2013 |
| JP | 2014-154445 A | 8/2014 |
| JP | 2015-041583 A | 3/2015 |
| WO | 2017/010255 A1 | 1/2017 |
| WO | 2017/013827 A1 | 1/2017 |

OTHER PUBLICATIONS

International Search Report for PCT/JP2018/003215 dated Apr. 3, 2018 [PCT/ISA/210].
Ebbing, General Chemistry, 1984, Houghton Mifflin, p. 847. (Year: 1984).

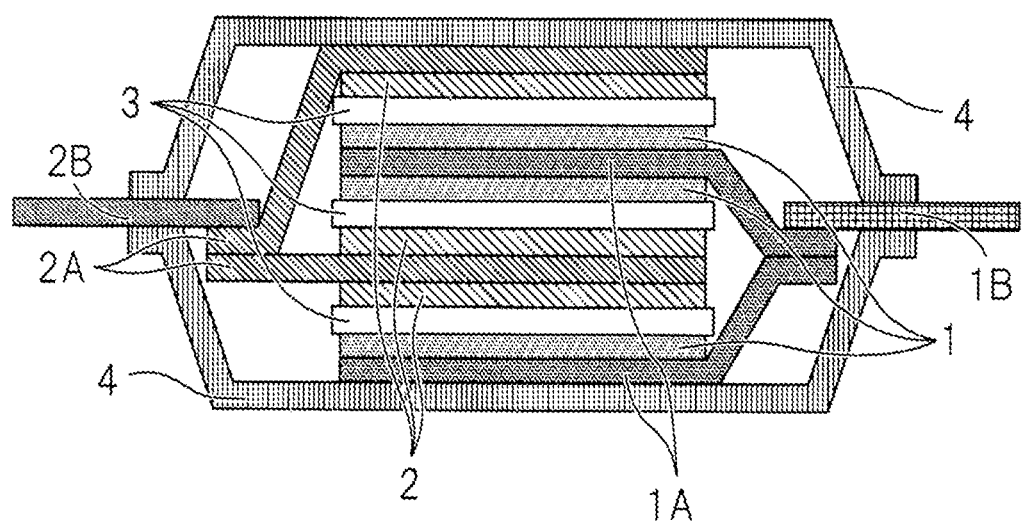

LITHIUM-MANGANESE COMPOSITE OXIDE, AND METHOD FOR PRODUCING SAME, AND POSITIVE ELECTRODE MATERIAL, POSITIVE ELECTRODE AND LITHIUM ION SECONDARY BATTERY USING SAME

CROSS REFERENCE TO RELATED APPLICATIONS

This is a divisional application based upon U.S. patent application Ser. No. 16/482,126 filed Jul. 30, 2019, which is a U.S. National Stage of International Application No. PCT/JP2018/003215 filed Jan. 31, 2018, claiming priorities to Japanese Patent Application No. 2017-015472 filed Jan. 31, 2017 and Japanese Patent Application No. 2017-253731 filed Dec. 28, 2017, the contents of all of which are incorporated herein by reference in their entirety.

TECHNICAL FIELD

The present invention relates to a lithium-manganese composite oxide and a method for producing the composite oxide, and a positive electrode material, a positive electrode and a lithium ion secondary battery that use the composite oxide.

BACKGROUND ART

Recently, a wide variety of electronics and electronic systems have been developed. Along with the development, higher performance of storage batteries serving as a power source has been desired. Particularly, lithium ion batteries are widely spread as a secondary battery serving as a power supply for electronics such as a mobile communication device and a laptop computer. In view of environmental load reduction, use of the lithium ion batteries as batteries for driving automobile motors and as stationary storage batteries and installation of the lithium ion batteries in the next-generation robots and drones are expected and a further increase in capacity of the batteries is required. In addition, in case a rapid power-output change occurs, charge and discharge at a high rate is required.

In small and portable lithium ion secondary batteries currently in use, lithium cobalt oxide ($LiCoO_2$) is mainly used as a positive electrode material, and cobalt as a rare metal is contained in a large amount. It is a factor that raises the cost of lithium ion batteries. In particular, batteries for driving automobile motors and stationary storage batteries have been increased in size. In the circumstance, it is difficult to use $LiCoO_2$ containing a rare metal, cobalt, in view of cost.

As an alternative material for $LiCoO_2$ serving as a positive electrode material, e.g., lithium nickel oxide ($LiNiO_2$) and lithium manganese oxide ($LiMn_2O_4$), which are formed of cheap elements abundantly present as resources, are known. However, $LiNiO_2$ has a problem in that safety of a battery is low in charging. $LiMn_2O_4$ has a problem not only in that capacity is low but also in that trivalent Mn leaks out into the electrolytic solution in charging and discharging at a high temperature, with the result that battery characteristics may deteriorate.

In contrast, in order to increase capacity and reduce cost, a Li-rich layered positive electrode material of $Li_2MnO_3$ system has been investigated. For example, Patent Literature 1 and Non Patent Literature 1 disclose a $Li_2MnO_3$ based positive electrode material for a lithium ion secondary battery, the material containing iron, which is abundantly present as a resource and enables cost reduction, and having a layered halite structure.

Patent Literature 2 discloses a Ti and Ni containing lithium-manganese composite oxide represented by the composition formula: $Li_{1+x}(M_{1-n-m}Ni_mTi_n)_{1-x}O_2$ where $0<x<0.33$, $0.05<m<0.3$, and $0.3<n<0.5$ and having a mixed phase consisting of a layered halite structure crystal phase and a cubic halite structure crystal phase, as a positive electrode material that can be obtained from inexpensive materials and exhibit excellent charge and discharge characteristics.

Patent Literature 3 discloses a method for simply producing a positive electrode material for a lithium ion secondary battery, consisting of a lithium ferrite composite oxide having a layered halite structure. The composition formula of the lithium ferrite composite oxide is $Li_{1+x}(Mn_{1-n-m}Fe_n Ni_m)_{1-x}O_2$ where $0<x<1/3$, $0.01 \leq m \leq 0.50$, $0.05 \leq n \leq 0.75$, and $0.06 \leq m+n<1$.

Patent Literature 4 discloses, as a lithium-manganese composite oxide expected as a positive electrode material replaceable for a lithium cobalt positive electrode material, a lithium-manganese composite oxide having a monoclinic layered halite structure represented by the composition formula: $Li_{1+x}(Mn_{1-m-n}Fe_mNi_n)_{1-x}O_2$ ($0 \leq x<1/3$, $0 \leq m \leq 0.6$, $0 \leq n \leq 0.3$) where the molar ratio of Mn, Fe and Ni and the average oxidation number fall within predetermined ranges, for providing a novel material that can exhibit more excellent charge and discharge characteristics.

CITATION LIST

Patent Literature

Patent Literature 1: JP4963059B
Patent Literature 2: JP3940788B
Patent Literature 3: JP2006-36621A
Patent Literature 4: JP2013-212959A

Non Patent Literature

Non Patent Literature 1: J. Appl. Phys. 2008, 104, 043909

SUMMARY OF INVENTION

Technical Problem

However, it is required that the lithium ion batteries disclosed in the Patent Literatures and Non Patent Literature mentioned above have a further higher capacity. In addition, in order to attain charge and discharge at a high rate, it is required that the batteries are reduced in resistivity. In the circumstance, a first object of the present invention is to provide a lithium-manganese composite oxide realizing high capacity, which solves the aforementioned problem and a positive electrode material, a positive electrode and a lithium ion secondary battery using the composite oxide. A second object of the present invention is to provide a lithium-manganese composite oxide realizing high capacity and low resistivity, which solves the aforementioned problem and a positive electrode material, a positive electrode and a lithium ion secondary battery that use the composite oxide.

Solution to Problem

According to an aspect of the present invention, there is provided a lithium-manganese composite oxide containing a lithium-iron-manganese composite oxide represented by the composition formula: $Li_{1+x-w}(Fe_yNi_zMn_{1-y-z})_{1-x}O_{2-\delta}$ wherein $0<x<\frac{1}{3}$, $0 \leq w<0.8$, $0<y<1$, $0<z<0.5$, $y+z<1$, and $0 \leq \delta <0.5$. At least in a state of charge of a lithium ion battery using the lithium-manganese composite oxide as a positive-electrode active material, at least some of iron atoms are pentavalent.

According to another aspect of the present invention, there is provided a lithium-manganese composite oxide containing the lithium-iron-manganese composite oxide represented by the aforementioned composition formula, wherein at least some of iron atoms are pentavalent.

According to another aspect of the present invention, there is provided a lithium-manganese composite oxide, in which the lithium-iron-manganese composite oxide represented by the aforementioned composition formula satisfies $0<w<0.8$. More specifically, there is provided a lithium-manganese composite oxide containing lithium-iron-manganese composite oxide represented by the composition formula: $Li_{1+x-w}(Fe_yNi_zMn_{1-y-z})_{1-x}O_{2-\delta}$ wherein $0<x<\frac{1}{3}$, $0<w<0.8$, $0<y<1$, $0<z<0.5$, $y+z<1$, and $0 \leq \delta <0.5$, wherein at least some of iron atoms are pentavalent.

According to another aspect of the present invention, there is provided a positive electrode material using any one of the aforementioned lithium-manganese composite oxides.

According to another aspect of the present invention, there is provided a positive electrode for a lithium ion secondary battery, containing any one of the aforementioned lithium-manganese composite oxides as the positive-electrode active material or the aforementioned positive electrode material.

According to another aspect of the present invention, there is provided a lithium ion secondary battery using the aforementioned positive electrode.

According to another aspect of the present invention, there is provided a method for producing the aforementioned lithium-manganese composite oxide by a wet chemical process using a coprecipitation-baking method, including coprecipitating and bubbling using a divalent Mn salt in combination with a trivalent or higher-valent Mn salt as a Mn source, mixing a lithium salt, drying and grinding, and baking and water-washing.

According to another aspect of the present invention, there is provided the method for producing the aforementioned lithium-manganese composite oxide, including detaching Li with an oxidant.

Advantageous Effects of Invention

According to an exemplary embodiment, it is possible to provide a lithium-manganese composite oxide that can realize high capacity, and a positive electrode and a lithium ion secondary battery that use the composite oxide.

According to another exemplary embodiment, it is possible to provide a manganese composite oxide that can realize high capacity and low resistivity, and a positive electrode using the composite oxide, and a lithium ion secondary battery having a high capacity and excellent rate characteristics.

BRIEF DESCRIPTION OF DRAWING

FIG. 1 is a schematic sectional view of a structure of a lithium ion secondary battery according to an exemplary embodiment.

DESCRIPTION OF EMBODIMENTS

The present inventors were aware that in order to increase capacity of a lithium ion secondary battery, increasing the valence of a transition metal, for example, an iron ion, in a Li-rich layered positive electrode material in charging is a problem to be solved. They conducted intensive studies in order to solve the problem. As a result, they found that a capacity increase of the battery can be realized by preparing a lithium-iron-manganese composite oxide represented by the composition formula: $Li_{1+x-w}(Fe_yNi_zMn_{1-y-z})_{1-x}O_{2-\delta}$, wherein $0<x<\frac{1}{3}$, $0 \leq w<0.8$, $0<y<1$, $0<z<0.5$, $y+z<1$, and $0 \leq \delta <0.5$ by replacing a part of a low-valent Mn source such as Mn (II) salt with a high-valent Mn source such as potassium permanganate (VII) or manganese acetate (III), and producing a lithium ion battery using the composite oxide as a positive-electrode active material, wherein at least some of iron atoms are pentavalent at least in a state of charge. If such a lithium-iron-manganese composite oxide is used as a positive-electrode active material, a high-capacity lithium ion secondary battery can be provided.

Now, the present invention will be more specifically described by way of lithium-iron-manganese composite oxides according to first and second exemplary embodiments.

(Lithium-Iron-Manganese Composite Oxide According to First Exemplary Embodiment)

The present inventors have found that in order to increase the capacity of a lithium ion secondary battery, increasing the valence of a transition metal, for example, an iron ion, in a Li-rich layered positive electrode material in charging is a problem to be solved. They conducted intensive studies in order to solve the problem. As a result, they have found that a capacity increase of the battery can be realized by preparing a lithium-iron-manganese composite oxide represented by the composition formula: $Li_{1+x-w}(Fe_yNi_zMn_{1-y-z})_{1-x}O_{2-\delta}$, wherein $0<x<\frac{1}{3}$, $0 \leq w<0.8$, $0<y<1$, $0<z<0.5$, $y+z<1$, and $0 \leq \delta <0.5$ by replacing a part of a low-valent Mn source such as Mn (II) salt with a high-valent Mn source such as potassium permanganate (VII) or manganese acetate (III), and producing a lithium ion battery using the composite oxide as a positive-electrode active material, wherein at least some of iron atoms are pentavalent in a state of charge.

More specifically, according to an exemplary embodiment, it is possible to provide a lithium-iron-manganese composite oxide represented by the composition formula: $Li_{1+x-w}(Fe_yNi_zMn_{1-y-z})_{1-x}O_{2-\delta}$, wherein $0<x<\frac{1}{3}$, $0 \leq w<0.8$, $0<y<1$, $0<z<0.5$, $y+z<1$, and $0 \leq \delta <0.5$. In a lithium ion battery using the composite oxide as a positive-electrode active material, at least some of iron atoms are pentavalent in the state of charge. If such a lithium-iron-manganese composite oxide is used as a positive-electrode active material, a high capacity lithium ion secondary battery can be provided. Note that, in the lithium-iron-manganese composite oxide, the iron can be trivalent in the state before use as a positive-electrode active material and in the state of discharge of a lithium ion battery using the composite oxide as a positive-electrode active material.

In order to achieve a sufficiently high capacity, the content of a pentavalent iron (atomic percentage relative to the total amount of iron) in the state of charge is preferably 5 atom % or more and more preferably 7 atom % or more. At this time, the state of charge is preferably SOC20% or more and more preferably SOC30% or more. In the state of charge after at least 20 cycles, the content of a pentavalent iron (atomic percentage relative to the total amount of iron) can be 5 atom % or more and further 7 atom % or more.

In the lithium ion battery, if graphite is used as a counter electrode (negative-electrode active material), it is preferable that at least some of iron atoms of the lithium-iron-manganese composite oxide are pentavalent within the voltage range of 3.0 to 4.8 V in the state of charge. The voltage is a positive electrode potential of Li standard (Li$^+$/Li).

In the state of charge of the lithium ion battery, it is preferable that 20% or more of Li detaches from a positive electrode and preferable that 30% or more of Li detaches from the positive electrode. The state of charge is preferably SOC (State of Charge)20% or more and more preferably SOC30% or more.

In the lithium ion battery, the Mn valence of the lithium-iron-manganese composite oxide, the average Mn valence in the state of charge and the state of discharge falls preferably within the range of 3.8 to 4.2 and is more preferably almost 4. It is further preferable that the Ni valence falls within the range of 3 to 4 in the state of charge and is 2 in the state of discharge. The voltage of the state of discharge is preferably 1.5 to 3.3 V.

A lithium-iron-manganese composite oxide represented by the aforementioned composition formula may be mixed with another lithium complex oxide and/or a lithium iron phosphate.

The lithium ion secondary battery according to an exemplary embodiment contains a lithium-iron-manganese composite oxide represented by the composition formula: $Li_{1+x-w}(Fe_yNi_zMn_{1-y-z})_{1-x}O_{2-\delta}$, wherein $0<x<\frac{1}{3}$, $0\le w<0.8$, $0<y<1$, $0<z<0.5$, $y+z<1$, and $0\le\delta<0.5$ as a positive-electrode active material and at least some of iron atoms of the lithium-iron-manganese composite oxide are pentavalent in the state of charge. In the state of discharge, the valence of iron is preferably 3.

In the lithium ion secondary battery, the voltage in the state of charge preferably falls within the range of 3.0 to 4.8 V when graphite is used as a counter electrode (negative-electrode active material).

In the lithium ion secondary battery, it is preferable that 20% or more of Li detaches from a positive electrode in the state of charge and 30% or more of Li detaches from the positive electrode. The state of charge is preferably SOC20% or more and more preferably SOC30% or more.

In the lithium ion secondary battery, for the Mn valence of the lithium-iron-manganese composite oxide, average Mn valences in the state of charge and the state of discharge preferably fall within the range of 3.8 to 4.2 and more preferably almost 4; and average Ni valence in the state of charge is preferably within the range of 3 to 4 and average Ni valence in the state of discharge is preferably 2. The voltage in the state of discharge is preferably 1.5 to 3.3 V.

(Lithium-Iron-Manganese Composite Oxide According to Second Exemplary Embodiment)

The present inventors have found that in order to increase the capacity of a lithium ion secondary battery, increasing the valence of a transition metal, for example, an iron ion, in a Li-rich layered positive electrode material is a problem to be solved. They conducted intensive studies in order to solve the problem. As a result, they have found that a lithium-iron-manganese composite oxide in which at least some of iron atoms are pentavalent can be realized by preparing a lithium-iron-manganese composite oxide represented by the composition formula: $Li_{1+x-w}(Fe_yNi_zMn_{1-y-z})_{1-x}O_{2-\delta}$, wherein $0<x<\frac{1}{3}$, $0<w<0.8$, $0<y<1$, $0<z<0.5$, $y+z<1$, and $0\le\delta<0.5$ by replacing a part of low-valent Mn source such as a Mn (II) salt with a high-valent Mn source such as potassium permanganate (VII) or manganese acetate (III) and reacting with a Br compound to remove Li; and that if the composite oxide is used as a positive-electrode active material, a battery having a high capacity can be obtained. In addition, the conductivity of a lithium-iron-manganese composite oxide is improved by increasing valence. Because of this, if the composite oxide is used as a positive-electrode active material, the internal resistivity of the battery decreases and thereby the rate of the battery can be improved.

More specifically, according to an exemplary embodiment, it is possible to provide a lithium-iron-manganese composite oxide represented by the composition formula: $Li_{1+x-w}(Fe_yNi_zMn_{1-y-z})_{1-x}O_{2-\delta}$, wherein $0<x<\frac{1}{3}$, $0<w<0.8$, $0<y<1$, $0<z<0.5$, $y+z<1$, and $0\le\delta<0.5$, wherein at least some of iron atoms are pentavalent. If such a lithium-iron-manganese composite oxide is used as a positive-electrode active material, a lithium ion secondary battery being high in capacity and excellent in rate characteristics can be provided.

In order to attain a sufficiently high capacity, the content of a pentavalent iron (atomic percentage relative to the total amount of iron) is preferably 5 atom % or more, more preferably 7 atom % or more and further preferably 10 atom % or more.

In a lithium-iron-manganese composite oxide represented by the aforementioned composition formula, it is preferable that nickel is trivalent or lower-valent and manganese is tetravalent or lower-valent.

A lithium-iron-manganese composite oxide represented by any one of the aforementioned composition formulae and another lithium complex oxide and/or a lithium iron phosphate may be used as a mixture.

A lithium-iron-manganese composite oxide represented by any one of the aforementioned composition formulae and a conductive material may be used as a mixture. As the conductive material, a carbonaceous material is preferable and at least one selected from carbon nanotube, carbon fiber, carbon black, Ketjen black, acetylene black, carbon nanohom and carbon nano brush is preferable.

[Method for Measuring the Valence of Iron Ion of Lithium-Iron-Manganese Composite Oxide]

The valence of an iron ion of a lithium-iron-manganese composite oxide was determined by placing a lithium-iron-manganese composite oxide (prepared) in the $^{57}$Fe Moessbauer spectrometer and carrying out measurement within a predetermined velocity range (for example, ±4 mm/s).

In contrast, the valence of an iron ion in the state of charge of a lithium ion battery was measured in accordance with the following method.

A lithium secondary battery using a lithium-manganese composite oxide containing iron as a positive electrode was prepared, charged in a predetermined condition and disassembled in an ultra-low humidity environment within, e.g., a glove box. The positive electrode was taken out, washed with a low boiling-point solvent, wrapped with aluminum laminate and taken out from the glove box. The positive electrode wrapped with aluminum laminate was placed in the $^{57}$Fe Moessbauer spectrometer and measurement was carried out within a predetermined velocity range.

The data obtained, from which data items corresponding to an Fe component within the aluminum laminate were removed, were fitted with a plurality of symmetry doublet components and area ratios of individual components were calculated. Note that, the area ratios are values obtained by dividing the areas of individual components by the sum of the areas of individual components. When the isomeric shift (IS) value corresponding to the center of gravity of the doublet was compared to the value described in literatures, the valence to which iron ion belongs, was determined. Velocity correction was carried out by use of α-Fe foil. The area ratios of individual components were determined as the component ratios of individual iron ions.

Note that, if the area ratios of individual components are multiplied by iron ion valences thereof and the sum of the products is obtained, an average valence of iron ions can be calculated. For example, if the spectrum obtained can be fitted with two components, component A and component B different in isomer shift value, an average valence can be calculated in accordance with the following expression:

Average valence of iron ion=(iron ion valence of component $A$)×(area ratio of component $A$)+ (iron ion valence of component $B$)×(area ratio of component $B$).

The composition formula of a sample obtained as a lithium-iron-manganese composite oxide can be obtained by ICP (Inductively Coupled Plasma). The valence of a transition metal in the sample can be evaluated by synchrotron radiation X-ray absorption spectroscopy (XAS). The ratio of Li and a transition metal can be evaluated by ICP.

Now, exemplary embodiments will be more specifically described below.

[Lithium-Iron-Manganese Composite Oxide]

The lithium-iron-manganese composite oxide according to the first exemplary embodiment is a lithium-iron-manganese composite oxide represented by the following composition formula (1):

wherein $0<x<1/3$, $0 \leq w<0.8$, $0<y<1$, $0<z<0.5$, $y+z<1$, and $0 \leq \delta<0.5$.

The lithium-iron-manganese composite oxide according to the second exemplary embodiment is a lithium-iron-manganese composite oxide represented by the following composition formula (2):

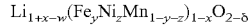

wherein $0<x<1/3$, $0<w<0.8$, $0<y<1$, $0<z<0.5$, $y+z<1$, and $0 \leq \delta<0.5$.

These lithium-iron-manganese composite oxides preferably contain a layered halite structure as a main crystal structure. The layered halite structure can be represented by the following space group.

Hexagonal Crystal Display:

Space group $R\bar{3}m$ [Expression 1]

Monoclinic Display:

Space group $C2/m$ [Expression 2]

These lithium-iron-manganese composite oxides may contain another crystal structure such as a spinel structure and a cubic halite structure as a subphase.

If x, w, y, z and δ satisfy the above ranges, any composition can be acceptable.

As to the content (1+x) of Li, the value x is desirably large in view of capacity; however, if the value x is large, a Li oxide tends to precipitate. For the reason, x can be set within the range of $0<x<1/3$, preferably $0.05<x<0.30$, more preferably $0.10<x<0.30$ and further preferably $0.20<x<0.30$.

In the content (1+x−w) of Li in the Formula (2), x is desirably large in view of capacity; however, if the value x is large, a Li oxide tends to precipitate. For the reason, $0<x<1/3$ can be specified, preferably $0.05<x<0.30$, more preferably $0.10<x<0.30$ and further preferably $0.20<x<0.30$.

The detachment amount (w) of Li in the Formula (2) is preferably large in order to increase the amount of pentavalent irons. For the reason, $0.01<w$ is preferable; $0.05<w$ is more preferable; and $0.1<w$ is further preferable. If the amount of Li decreases, the capacity decreases. For the reason, $w<0.8$ is preferable, $w<0.5$ is more preferable and $w<0.3$ is further preferable. In order to sufficiently obtain the effect produced by Li detachment, the content (1+x−w) of Li after Li detachment is preferably 1 or less and more preferably less than 1.

As the content (z) of Ni, if the amount of Ni increases, the cost rises. For the reason, $0<z<0.5$ can be specified. In view of an addition effect of Ni and the cost, the range of $0.05<z<0.50$ is preferable, $0.10<z<0.30$ is more preferable and $0.10<z<0.20$ is further preferable.

As to the content (y) of Fe, in order to reduce the cost while keeping a sufficient capacity, $0<y<1$ can be specified, $0.05<y<0.50$ is preferable, $0.10<y<0.30$ is more preferable, and $0.10<y<0.20$ is further preferable. The ratio of Fe to Ni, y/z (atomic ratio Fe/Ni) is preferably 3/7 to 7/3 and more preferably 4/6 to 6/4.

As to the content (1−y−z) of Mn, if Mn is contained, iron and oxygen can serve as oxidative and reductive elements, with the result that a capacity increase can be expected. For the reason, y+z<1 can be specified, y+z<0.90 is preferable, y+z<0.60 is more preferable, and y+z<0.40 is further preferable.

As to the content (δ) of O, $0 \leq \delta<0.5$ can be specified, $0 \leq \delta<0.2$ is preferable, and $0 \leq \delta<0.1$ is more preferable.

[Method for Producing Lithium-Iron-Manganese Composite Oxide]

The lithium-iron-manganese composite oxide according to the exemplary embodiment can be obtained by a wet chemical process mainly using coprecipitation-baking method, which is characterized in that part of Mn (II) salt usually used is replaced with a high-valent Mn source such as potassium permanganate (VII) and manganese acetate (III).

The method for producing according to the exemplary embodiment is a method for producing a lithium-manganese composite oxide by a wet chemical process using coprecipitation-baking method, including a coprecipitation and bubbling step using a divalent Mn salt in combination with a trivalent or higher-valent Mn salt, as a Mn source; a lithium salt mixing step, a drying and grinding step and a baking and water-washing step. Particularly in the case of producing a lithium-iron-manganese composite oxide represented by the composition formula (2), a step of detaching Li with bromine (Li detachment step) is further included.

[Coprecipitation and Bubbling Step]

This step includes preparing an aqueous solution of transition metal salts (metal source) containing transition metals constituting a desired lithium-manganese composite oxide, gradually adding the aqueous solution dropwise to an alkaline solution controlled in temperature and bubbling the precipitate obtained followed by water washing. Usually, the ratio (atomic ratio) of metals contained in the substance to be obtained is equal to the ratio (atomic ratio) of the metals of starting transition metal salts.

As to the metal sources to be used, the metal sources except the source for a Mn salt are not particularly limited. As a Ni source and an Fe source, a sulfate, a chloride, a nitrate and an acetate (including hydrates thereof) can be used. Also, a solution prepared by dissolving a metal oxide or a metal with an acid can be used as a metal source.

As the Mn source to be used as a metal source, a Mn (II) source (a divalent Mn salt) and a high-valent Mn source (a trivalent or higher-valent Mn salt) are used in combination.

As the Mn (II) source, a sulfate, a chloride, a nitrate and an acetate (including hydrates thereof) similarly to the cases of the Ni source and the Fe source, and a solution prepared by dissolving a Mn oxide or Mn with an acid, can be used.

The case of the exemplary embodiment is characterized by using such a Mn (II) source in combination with a high-valent Mn source.

Since the valence of Mn in a final product (active material) is mostly tetravalent, it is desirable that the valence of Mn within a coprecipitate is also close to a tetravalence as much as possible.

The transition metal distribution in a primary particle of an active material can be uniformized by using a high-valent Mn source. This is considered because a high-valent Mn is smaller in ion radius and tends to be homogeneous in mixing.

As a source for high-valent Mn, a trivalent or higher-valent Mn salt, such as potassium permanganate ($KMnO_4$), manganese acetate (III) and manganese (III) acetyl acetate (including hydrates thereof), can be used.

The atomic mixing ratio of a high-valent Mn source and a Mn (II) source is arbitrarily set but the ratio (molar ratio) of a high-valent Mn source: Mn (II) source is preferably 1:9 to 9:1, for example, can be set within the range of 4:6 to 6:4.

When an aqueous solution containing two types of Mn sources, an Fe source and a Ni source is prepared, the concentration thereof, which is not particularly limited, is desirably about 0.1 to 10 M (mol/L).

When an aqueous solution of a metal source is added to an alkaline solution controlled in temperature, the type of alkali is not particularly limited; for example, sodium hydroxide, lithium hydroxide, potassium hydroxide and ammonia water can be used. The concentration of the alkali is not particularly limited as long as the high pH value (11 or more) of the alkaline solution can be maintained even at the end of dropwise addition. Note that if $KMnO_4$ is used as a high-valent Mn source, it is preferable to add a water soluble alcohol such as ethanol to an alkaline solution side for forming a precipitate. An alcohol serves as an antifreezing solution and the temperature of the solution can be maintained at the freezing point of water or less. The time for adding an aqueous solution of a metal source dropwise to an alkaline solution, which is not particularly limited, is usually and satisfactorily several hours. The temperature of an alkaline solution to be maintained during dropwise addition is preferably lower than 50° C., more preferably 40° C. or less and particularly desirably room temperature (30° C.) or less. If an alkaline solution is added dropwise at 50° C. or more, transition metal elements are segregated. Thus, the temperature of 50° C. or more is not preferable.

The bubbling step is a step of aging the obtained precipitate by a wet oxidation process conducting blowing air or oxygen into it. The gas to be blown in may be the air and preferably oxygen for reducing the bubbling time. The bubbling time, which is not particularly limited, is preferably several hours or more and about two days or less. The aged product is washed with water and filtered to obtain a precursor as a material for baking.

[Lithium Source Mixing Step and Drying/Grinding Step]

In a step of mixing the precursor obtained with a lithium source, the precursor is preferably mixed without drying. This is because if the precursor containing a large amount of residual alkali is dried, the dried powder becomes rigid and cannot be easily ground.

Although the lithium source to be mixed is not particularly limited, not only an inexpensive lithium carbonate but also a lithium salt such as lithium hydroxide, lithium nitrate, lithium acetate and lithium chloride (each including a hydrate) can be used. The mixing ratio of the precursor and a lithium source can be arbitral but, the mixing ratio can be set such that the atomic ratio of lithium of the lithium source to the transition metals of the precursor (Li/(Fe+Ni+Mn)) is preferably 1.1 or more and 3 or less, more preferably 1.4 or more and 3 or less, further preferably 1.4 or more and 2.0 or less. The amount of lithium beyond the above range is not preferable in order to reduce manufacturing cost.

In mixing a precursor and a lithium source, if a water insoluble lithium carbonate is used, it is preferable that the lithium carbonate is dispersed in water and thereafter mixed with the precursor with stirring; whereas, if a water-soluble lithium salt is used, it is desirable that the lithium salt is dissolved in water and thereafter mixed with the precursor with stirring.

After mixing a precursor and a lithium source, the resultant mixture is dried. The drying temperature is desirably less than 90° C. This is because if the drying temperature is 100° C. or more, the viscosity decreases, with the result that the precursor and the lithium source are easily separated. The drying time, which is not particularly limited, is usually and sufficiently 12 hours or more.

Subsequently, the dried mixture is ground. The conditions and apparatus for grinding are not particularly limited as long as uniform color tone can be obtained without coarse particles.

[Baking and Water-Washing Step]

The ground mixture is then baked. The baking can be carried out in any atmospheric condition such as the air, an oxidizing atmosphere, an inert atmosphere or a reducing atmosphere. The baking temperature can be set at 200° C. or more, preferably 300° C. or more and 1000° C. or less.

As the baking, a primary baking and a secondary baking are preferably performed.

The condition of the primary baking is not particularly limited as long as it is carried out in the air or an oxidizing atmosphere. Although the temperature for the primary baking is not particularly limited, the temperature is desirably 1000° C. or less in order to reduce evaporation of Li at a high temperature. The temperature for the primary baking can be set at 200° C. or more and can be set at 300° C. or more.

The secondary baking can be carried out in an inert atmosphere or a reducing atmosphere. Owing to the secondary baking, charge and discharge characteristics (initial charge and discharge efficiency or cycle characteristics, rate characteristics) can be further improved. The temperature for the secondary baking is desirably 1000° C. or less, similarly to the temperature for the primary baking. The temperature for the secondary baking can be set at 200° C. or more and can be set at 300° C. or more.

After baking, a sample is taken out from an electric furnace, ground and washed with water to remove an excessive lithium salt.

[Li Detachment Step]

When a lithium-iron-manganese composite oxide represented by the composition formula (2) is produced, a desired product can be obtained by reacting the sample obtained with an oxidant such as bromine and nitronium tetrafluoroborate ($NO_2BF_4$) in a solvent such as acetonitrile. For example, the reaction can be carried out by dispersing a powder sample in the solvent and dissolving the oxidant such as bromine with stirring while controlling the temperature. As the oxidant to be used in the reaction, bromine is preferable. The reaction temperature can be set to fall within the range of 0 to 50° C., preferably 10 to 30° C. and more preferably room temperature in view of cost. The reaction time is desirably about 0.5 to 5 hours. The solvent to be used in the reaction is not particularly limited as long as it is a non-aqueous solvent and is preferably acetonitrile, ethanol, acetone or ether and particularly preferably acetonitrile.

After the reaction, the sample was washed well with a solvent such as acetonitrile, filtered and dried to successfully obtain a final product.

[Lithium-Manganese Composite Oxide Having High Valent State in State of Charge]

A lithium-iron-manganese composite oxide represented by the composition formula (1) and produced by the production method according to the exemplary embodiment is employed as a positive-electrode active material to prepare a lithium ion battery and the lithium ion battery is charged. At the state of charge, at least a part of iron of the lithium-iron-manganese composite oxide is pentavalent.

If the potential is raised from 0 V to 4.8 V at a constant current, a lithium ion detaches from the positive-electrode active material of the lithium ion battery and moves to the negative electrode (charge). At this time, the transition metals and oxygen of the positive-electrode active material are oxidized and the valence increases. At this time, at least some of iron ions is pentavalent and increases the capacity. Thereafter, the potential is reduced to up to about 1.5 V (discharge). The pentavalent iron formed in charging is reduced to mostly a trivalent iron. If the above operation (charge and discharge) is repeated, valence changes substantially in the same manner as this. Note that, the potential herein is a positive electrode potential of Li standard ($Li^+$/Li).

In order to achieve a sufficiently high capacity, the content of a pentavalent iron (atomic percentage relative to the total amount of iron) in the state of charge is preferably 5 atom % or more and more preferably 7 atom % or more. At this time, the state of charge is preferably SOC20% or more and more preferably SOC30% or more. At the state of charge after at least 20 cycles, the content of a pentavalent iron (atomic percentage relative to the total amount of iron) can be 5 atom % or more and further 7 atom % or more.

[Positive Electrode]

As the positive-electrode active material, other than the above lithium-iron-manganese composite oxide, a positive-electrode active material known in the art can be mixed. Examples thereof include $LiCoO_2$, $LiNiO_2$, $LiMn_2O_4$, $LiFePO_4$, $LiFeSiO_4$, $LiFeBO_3$, $Li_3V_2(PO_4)_3$, $Li_2FeP_2O_7$, $LiNi_{0.5}Mn_{1.5}O_4$, $LiCo_{1/3}Ni_{1/3}Mn_{1/3}O_2$ and $Li_4Ti_5O_{12}$.

As the positive-electrode active material, a positive-electrode active material having an average particle diameter within the range of, e.g., 0.1 to 50 μm, can be used in view of, e.g., reactivity with an electrolytic solution and rate characteristics, preferably within the range of 0.5 to 30 m and more preferably 1 to 20 μm. The average particle diameter herein refers to a particle diameter (median diameter: $D_{50}$) at a cumulative value of 50% in a particle size distribution (volume basis) measured by a laser diffraction scattering method.

Examples of a binder for a positive electrode include, but are not particularly limited to, polyvinylidene fluoride (PVdF), a vinylidene fluoride-hexafluoropropylene copolymer, a vinylidene fluoride-tetrafluoroethylene copolymer, a styrene-butadiene copolymer rubber, polytetrafluoroethylene, polypropylene, polyethylene, polyimide, polyamide imide, methyl (meth)acrylate, ethyl (meth)acrylate, butyl (meth)acrylate, (meth)acrylonitrile, SBR (styrene-butadiene rubber), an isoprene rubber, a butadiene rubber and a fluorine rubber. The content of the binder for a positive electrode falls within the range of preferably 1 to 25 parts by mass relative to the positive-electrode active material (100 parts by mass), more preferably 2 to 20 parts by mass and further preferably 2 to 10 parts by mass, in view of binding strength and energy density having a trade-off relationship.

Examples of the conductive material for a positive electrode include, but are not particularly limited to, a carbonaceous material such as graphite, carbon black, acetylene black, Ketjen black, carbon nanohorn, carbon nano brush, carbon fiber, carbon nanotube and graphene. The content of the conductive material to be used for reducing electrode resistivity falls within the range of preferably 1 to 25 parts by mass relative to the positive-electrode active material (100 parts by mass), more preferably 2 to 20 parts by mass and further preferably 2 to 10 parts by mass in view of internal resistivity and capacity having a trade-off relationship.

The positive electrode for a lithium ion battery can be formed by a general slurry application method, for example, by preparing a slurry containing a positive-electrode active material, a binder, a conductive material (if necessary) and a solvent, applying the slurry onto a positive electrode current collector, drying and, if necessary, applying pressure to form a positive-electrode active material layer on the positive electrode current collector. Examples of a method for applying a slurry include a doctor blade method, a die coater method and a dip coating method. A positive-electrode active material layer may be previously formed, and thereafter, a metal thin film may be formed by, e.g., a deposition or spattering method, as a current collector to form a positive electrode. As the solvent for a slurry, N-methyl-2-pyrrolidone (NMP) and water can be used. If water is used as the solvent, further a thickener such as carboxymethylcellulose, methylcellulose, hydroxymethylcellulose, ethyl cellulose and polyvinyl alcohol can be used.

[Negative Electrode]

Any material can be used in a negative electrode as long as the material can absorb or release a lithium ion. For example, a film can be formed of a lithium metal, a lithium alloy or a negative-electrode active material for a lithium ion battery known in the art with, e.g., a binder, on a current collector as a negative-electrode active material layer and put in use. A lithium metal and a lithium alloy are usually used as a test cell due to a problem of, e.g., a dendrite. Practically, a negative electrode using a negative-electrode active material is preferably used.

As the negative-electrode active material for a lithium ion battery, a carbonaceous negative-electrode active material (graphite, soft carbon, hard carbon, amorphous carbon) usually used in a lithium ion battery, and a metal, a metal oxide or a semi-metallic material such as Sn, Si or SiO, can be used.

The negative electrode using such a negative-electrode active material can be formed in the same manner as in a positive electrode, by preparing a slurry containing a negative-electrode active material, a binder and a solvent (for example, NMP) (further a conductive auxiliary material, if necessary), applying the slurry onto a negative electrode current collector, drying and, if necessary, applying pressure to form a negative-electrode active material layer on the negative electrode current collector.

As the binder for a negative electrode, the same binder as used for a positive electrode can be used. The content of the binder for a negative electrode falls within the range of preferably 0.1 to 30 parts by mass relative to the negative-electrode active material (100 parts by mass), more preferably 0.5 to 25 parts by mass and further preferably 1 to 20 parts by mass, in view of binding strength and energy density having a trade-off relationship.

[Electrolyte]

As the electrolyte, a non-aqueous electrolytic solution prepared by dissolving a lithium salt in one or two types or more non-aqueous solvents, can be used. Examples of the non-aqueous solvent include, but are not particularly limited to, a cyclic carbonate such as ethylene carbonate (EC), propylene carbonate (PC), butylene carbonate (BC) and vinylene carbonate (VC); a linear carbonate such as dimethyl carbonate (DMC), diethyl carbonate (DEC), ethyl methyl carbonate (EMC) and dipropyl carbonate (DPC); an aliphatic carboxylic acid ester such as methyl formate, methyl acetate and ethyl propionate; a γ-lactone such as γ-butyrolactone; a linear ether such as 1, 2-ethoxyethane (DEE) and ethoxymethoxyethane (EME); and a cyclic ether such as tetrahydrofuran and 2-methyl tetrahydrofuran. As a non-aqueous solvent, another solvent such as an aprotic organic solvent can be used. Examples thereof include dimethyl sulfoxide, 1,3-dioxolane, a dioxolane derivative, formamide, acetamide, dimethylformamide, acetonitrile, propionitrile, nitromethane, ethyl monoglyme, phosphate triester, trimethoxymethane, sulfolane, methyl sulfolane, 1,3-dimethyl-2-imidazolidinone, 3-methyl-2-oxazolidinone, a propylene carbonate derivative, a tetrahydrofuran derivative, ethyl ether, 1,3-propanesultone, anisole and N-methyl pyrrolidone.

Examples of the lithium salt to be dissolved in a non-aqueous solvent include, but are not particularly limited to, $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_2$, $LiN(CF_3SO_2)_2$ and lithium bis(oxalate) borate. These lithium salts may be used alone or in combination (two or more). In place of the non-aqueous electrolytic solution, a polymer electrolyte or an ionic liquid may be used.

[Lithium Ion Battery]

The positive electrode and the negative electrode are arranged such that the active surfaces (active material layer) of them face to each other and the space between them is filled with an electrolyte as mentioned above. In this manner, a battery can be constituted.

Furthermore, a separator can be provided between the positive electrode and the negative electrode. As the separator, a porous film, a woven cloth or non-woven cloth made of a polyolefin such as a polypropylene and a polyethylene or a fluorine resin such as polyvinylidene fluoride or a polyimide can be used.

As the battery form, cylindrical, square, coin, button and laminate (layered) forms are mentioned.

In the case of a laminate form, a laminate film is preferably used as a package for housing a positive electrode, a separator, a negative electrode and an electrolyte. As the laminate film, a laminate film having a resin substrate, a metal foil layer and a heat sealing layer can be used. As the resin substrate, e.g., a polyester and a polyamide (nylon) may be mentioned. As the metal foil layer, e.g., aluminum, an aluminum alloy and a titanium foil may be mentioned. As a material for the heat sealing layer, a thermoplastic polymer material such as polyethylene, polypropylene and polyethylene terephthalate, may be mentioned. The resin substrate layer and the metal foil layer each are not limited to a single layer and may be constituted of two or more layers. In view of versatility and cost, an aluminum laminate film is preferable.

A positive electrode, a negative electrode and a separator arranged between them are housed in an outer-packaging container formed of, e.g., a laminate film. If a non-aqueous electrolytic solution is used as the electrolyte, the non-aqueous electrolytic solution is further injected and sealed. A structure, in which an electrode group obtained by stacking a plurality of electrode pairs is housed, may be formed.

FIG. 1 shows a structure of the lithium ion secondary battery according to an exemplary embodiment.

A positive electrode is constituted by forming a positive-electrode active material layer 1 containing a positive-electrode active material on a positive electrode current collector A. As the positive electrode, a single-sided electrode having the positive-electrode active material layer 1 formed on one of the surfaces of the positive electrode current collector TA and a two-sided electrode having the positive-electrode active material layer 1 formed on both surfaces of the positive electrode current collector 1A, are used.

A negative electrode is constituted by forming a negative-electrode active material layer 2 containing a negative-electrode active material on a negative electrode current collector 2A. As the negative electrode, a single-sided electrode having the negative-electrode active material layer 2 formed on one of the surfaces of the negative electrode current collector 2A and a two-sided electrode having the negative-electrode active material layer 2 formed on both surfaces of the negative electrode current collector 2A, are used.

The positive electrode and the negative electrode are arranged so as to face each other with a separator 3 interposed between them and stacked, as shown in FIG. 1. Two positive electrode current collectors 1A are connected to each other at one of the ends. To the connected portion, a positive tab 1B is connected. Two negative electrode current collectors 2A are connected to each other at the other end. To the connected portion, a negative tab 2B is connected. A laminate (power generation element) containing the positive electrodes and the negative electrodes is housed in a package 4 and impregnated with an electrolytic solution. The positive tab 1B and the negative tab 2B are exposed on the outside of the package 4. The package 4 is formed by overlapping two rectangle laminate sheets so as to contain the power generation element and heat sealing them at four edge portions.

EXAMPLES

Now, exemplary embodiments will be more specifically described below by way of Examples; however, the present invention is not limited to these Examples alone.

<Synthesis of Lithium-Iron-Manganese Composite Oxide>

An iron (III) nitrate nonahydrate, nickel nitrate (II) hexahydrate, potassium permanganate and manganese chloride tetrahydrate were prepared. These metal salts were blended so as to obtain a total amount of 0.25 mol and satisfy the following individual ratios, and dissolved in distilled water (0.5 L) to obtain metal salt solutions.

Metal ratio A (Fe:Ni:Mn)=2:2:6,
Metal ratio B (Fe:Ni:Mn)=1.5:1.5:7.0 (=15:15:70),
Metal ratio D (Fe:Ni:Mn)=1:1:8, The mixing molar ratio of both manganese salts (potassium permanganate and manganese chloride tetrahydrate)=1:1

Subsequently, sodium hydroxide (50 g) was dissolved in distilled water (0.5 L) in another beaker and 0.2 L of ethanol was added. The mixture was maintained in a thermostatic chamber while stirring at +20° C.

Subsequently, in the sodium hydroxide solution, the metal salt solutions prepared above each were added dropwise for 2 to 3 hours to obtain a coprecipitate.

After the coprecipitate was generated and the mixture was checked to have pH of 11 or more, the mixture (the entire aqueous solution containing the coprecipitate) obtained after the dropwise addition was taken out and subjected to a bubbling treatment performed in an oxygen gas generator at room temperature for two days. The precipitate was then washed with distilled water and filtered to obtain a precursor.

After 0.25 mol of lithium carbonate ($Li_2CO_3$) was dispersed in distilled water (0.2 L), the dispersion solution was put in a mixer and each of precursors was added. The mixture was mixed with stirring to prepare a paste. The paste was put in a container and dried at 50° C. for two days. A dried matter was taken out from a dryer and ground by a vibration mill to obtain a powder.

The powders obtained in this manner each were thinly spread over the cover of an alumina crucible and baked in an electric furnace in the air at 650° C. for 5 hours and ground. The ground matter was again baked at 850° C. for 5 hours in a nitrogen atmosphere. The furnace was cooled and a product was taken out. The product was ground and washed several times with 1 L of distilled water, filtered and dried at 100° C. In this manner, a lithium-iron-manganese composite oxide A (obtained in accordance with metal ratio A), a lithium-iron-manganese composite oxide B (obtained in accordance with metal ratio B) and a lithium-iron-manganese composite oxide D (obtained in accordance with metal ratio D) were obtained.

<Synthesis of Comparative Sample>

A ferric nitrate (III) nonahydrate and manganese chloride tetrahydrate were prepared. These metal salts were blended so as to obtain a total amount of 0.25 mol and satisfy the metal ratio (Fe:Mn)=1:1, and dissolved in distilled water (0.5 L) to obtain a metal salt solution. A desired comparative sample (C) was obtained in the same manner as the synthesis of lithium-iron-manganese composite oxide in the above section except that the above metal salt solution was used.

<Production of Positive Electrode>

Using lithium-iron-manganese composite oxide (A) $Li_{1.23}Mn_{0.46}Ni_{0.15}Fe_{0.15}O_2$, lithium-iron-manganese composite oxide (B) $Li_{1.26}Mn_{0.52}Fe_{0.11}Ni_{0.11}O_2$ and comparative sample (C) $Li_{1.20}Mn_{0.40}Fe_{0.40}O_2$ as the positive-electrode active material, positive electrodes were produced as follows. Note that, in each of these oxide compositions, the atomic ratio of Fe:Ni:Mn is a value based on the amounts of the staring materials. The atomic ratio of Li and a total of other metals (Fe, Ni and Mn) was confirmed by ICP (Inductively Coupled Plasma).

A mixture containing a positive-electrode active material (92% by mass), Ketjen black (4% by mass) and polyvinylidene fluoride (4% by mass) was added in a solvent to prepare a slurry. The slurry obtained was applied onto aluminum foil having a thickness of 20 μm and serving as a positive electrode current collector and dried to produce a positive electrode (thickness of the positive-electrode active material layer was 100 μm) having a thickness of 120 μm.

<Production of Negative Electrode>

A mixture containing graphite having an average particle diameter ($D_{50}$) of 15 μm (92% by mass), Ketjen black (4% by mass) and polyvinylidene fluoride (4% by mass) was added in a solvent to prepare a slurry. The slurry was applied to copper foil having a thickness of 10 μm and serving as a negative electrode current collector and dried to produce a negative electrode (thickness of the negative-electrode active material layer was 90 μm) having a thickness of 100 μm.

<Production of Lithium Ion Secondary Battery>

After the positive electrode and the negative electrode were formed, a positive tab and a negative tab were attached to the positive electrode and the negative electrode, respectively, by welding. Then, a porous-film separator was interposed to prepare a power generation element. The power generation element was wrapped with a package made of an aluminum laminate film and three sides of the package were heat-sealed. Thereafter, an EC/DEC electrolytic solution (electrolytic solution using a mixture of EC:DEC (volume ratio)=3:7 as a non-aqueous solvent) containing 1 mol/L $LiPF_6$ was injected in the package in vacuum of an appropriate degree. Thereafter, the remaining side of the package was heat-sealed under reduced pressure to produce a lithium ion secondary battery (not activated).

Note that, a positive electrode containing a lithium-iron-manganese composite oxide (A) is referred to as "positive electrode A", and the lithium ion secondary battery containing the positive electrode as "battery A". A positive electrode containing a lithium-iron-manganese composite oxide (B) is referred to as "positive electrode B", and the lithium ion secondary battery containing the positive electrode as "battery B". A positive electrode containing a comparative sample (C) is referred to as "positive electrode C", and the lithium ion secondary battery containing the positive electrode as "battery C".

<Activation Treatment>

Batteries A, B and C not activated were charged with a current of 20 mA/g per positive-electrode active material up to 4.5 V and discharged with a current of 20 mA/g per positive-electrode active material up to 1.5V. Subsequently, the batteries were charged with a current of 10 mA/g per positive-electrode active material up to 4.5 V and discharged with a current of 10 mA/g per positive-electrode active material up to 1.5 V. Thereafter, the batteries were charged with a current of 5 mA/g per positive-electrode active material up to 4.5 V and discharged with a current of 10 mA/g per positive-electrode active material up to 1.5 V.

Another battery A was prepared as a battery not subjected to an activation treatment, charged with a current of 5 mA/g up to 4.4 V and decomposed to obtain an electrode sample (electrode charged to 4.4 V).

<Evaluation of Lithium Ion Secondary Battery>

Batteries A, B and C activated were charged with a constant current of 20 mA/g per positive-electrode active material up to 4.5 V in a thermostatic chamber of 45° C. and further charged at a constant voltage of 4.5 V until a current of 5 mA/g was obtained. Thereafter, individual batteries were discharged with a current of 20 mA/g up to 1.5 V. The initial discharge capacity of battery A activated was 265 mAh/g, that of battery B was 270 mAh/g and that of battery C was 255 mAh/g.

<$^{57}$Fe Moessbauer Spectroscopy>

The chemical states of iron in a positive electrode of a battery in charge and discharge states were analyzed by Moessbauer spectroscopy as follows. Note that, at this time, the analysis was conducted in accordance with the aforementioned method of measuring valence of an iron ion in the lithium ion battery in the state of charge.

Batteries A, B and C activated and maintained in the state of charge, the state of discharge and SOC (State of Charge) 50% (50% charged after discharge) were prepared and separately disassembled to obtain electrodes for measurement.

Each of the batteries was disassembled under dry air of a dew point of −60° C. or less. The positive electrode was washed and enclosed with a laminate film. Moessbauer spectroscopy was carried out at room temperature, under normal pressure in the air by a transmission method. Powder states of the lithium-iron-manganese composite oxides (A), (B) and comparative sample (C), and also the charge states of them up to 4.4 V were analyzed by Moessbauer spectroscopy. Measurement results, from which the result corresponding to Fe in aluminum laminate separately measured was removed, were summarized in Table 1 and Table 2.

Table 1 shows measurement results of the lithium-iron-manganese composite oxide (A) and the positive electrode of battery A. Table 2 shows measurement results of the lithium-iron-manganese composite oxide (B) and the positive electrode of battery B. Table 1 and Table 2 show isomer shift δ (IS)[mm/s], the valences of iron ($Fe^{3+}$, $Fe^{5+}$), component ratio (ratio (atom %) of trivalent or pentavalent iron to the total amount of iron) in a powder state, a charged state to 4.4 V (Table 1 alone), state of charge, state of discharge and SOC50% state. Table 1 further shows measurement results in state of charge after 20 cycles and state of discharge after 20 cycles. The charge and discharge cycle was carried out in charge and discharge conditions in which the initial discharge capacity was obtained.

From comparison between Table 1/Table 2 and Non Patent Literature 1 (IS described in Tables), it is found that a trivalent iron is produced in the powder state and the state of discharge; however, not only a trivalent iron but also a pentavalent iron (about 10%) are generated in the state of charge. Almost the same results are obtained in the case of SOC50%. In contrast, in the case of battery C, a pentavalent iron was not found in all the states. From Table 1, it was found that a pentavalent iron is present even in the state of charge after 20 cycles and charge transfer from a trivalence to a pentavalence can stably performed. Note that, valence was determined based on the IS values. Since the peak position of IS and the valence of iron are correlated, the valence of iron can be determined based on the value of the peak position of IS.

TABLE 1

| | Component | Component ratio (%) | IS ($mms^{-1}$) |
|---|---|---|---|
| Powder state | $Fe^{3+}$ | 100 | 0.34 (9) |
| State of charge up to 4.4 V | $Fe^{3+}$ | 67.4 | 0.26 (2) |
| | $Fe^{5+}$ | 32.6 | −0.32 (1) |
| State of discharge | $Fe^{3+}$ | 100 | 0.34 (1) |
| SOC50% | $Fe^{3+}$ | 89.3 | 0.29 (3) |
| | $Fe^{5+}$ | 10.7 | −0.36 (2) |
| State of charge | $Fe^{3+}$ | 90.0 | 0.29 (2) |
| | $Fe^{5+}$ | 10.0 | −0.36 (5) |
| State of charge after 20 cycles | $Fe^{3+}$ | 92.1 | 0.30 (3) |
| | $Fe^{5+}$ | 7.9 | −0.34 (5) |
| State of discharge after 20 cycles | $Fe^{3+}$ | 100 | 0.33 (9) |

TABLE 2

| | Component | Component ratio (%) | IS ($mms^{-1}$) |
|---|---|---|---|
| Powder state | $Fe^{3+}$ | 100 | 0.34 (5) |
| State of discharge | $Fe^{3+}$ | 100 | 0.34 (1) |
| SOC50% | $Fe^{3+}$ | 89.0 | 0.30 (4) |
| | $Fe^{5+}$ | 11.0 | −0.32 (3) |
| State of charge | $Fe^{3+}$ | 89.2 | 0.29 (6) |
| | $Fe^{5+}$ | 10.8 | −0.38 (2) |

<Determination of Mn and Ni Valences>

An electrode in the state of charge (4.5 V) and the state of discharge (1.5 V) was evaluated for Mn and Ni by synchrotron radiation X-ray absorption spectroscopy (XAS).

The electrode was obtained as follows. First, using battery A activated, cells in the state of charge and the state of discharge were prepared and opened under dry air atmosphere. The positive electrode was washed with DEC, dried and sealed with Kempton tape. The positive electrode was measured by a transmission method.

In XAS, as valence increases, the peak of absorption spectrum parallelly shifts. The Valence of Mn was determined through comparison with Mn (0-valent), MnO (divalent) and $MnO_2$ (tetravalent); whereas the valence of Ni was determined through comparison with Ni (0-valent), NiO (divalent) and $LiNiO_2$ (trivalent). As a result, it was found that Mn is mostly a tetravalent in the state of charge and the state of discharge; Ni is between trivalent and tetravalent in the state of charge and divalent in the state of discharge. A battery A after 20 cycles was prepared and evaluated in the state of charge and the state of discharge. As a result, the same results as after activation were obtained.

<Detachment Treatment of Li from Lithium-Iron-Manganese Composite Oxide>

Lithium-iron-manganese composite oxide A and lithium-iron-manganese composite oxide D were separately dispersed in a 1 M bromine acetonitrile solution and stirred at room temperature for 3 hours.

After filtration, washing with 1 L of distilled water was carried out several times, drying at 100° C. was carried out to obtain a desired lithium-iron-manganese composite oxide A2 and lithium-iron-manganese composite oxide D2.

The lithium-iron-manganese composite oxides obtained were confirmed for the atomic ratio of Li and a total of other metals M (Fe, Ni and Mn) by ICP (Inductively Coupled Plasma). The composition ratios (atomic ratio of Li and other metal M) are shown in Table 3.

It is found that Li is detached by a Li detachment treatment using bromine and the amount of Li decreases. It is also found that synthesis is made in almost the same ratio as in the starting transition metal amount.

TABLE 3

| | Li/M | Fe/M | Mn/M | Ni/M |
|---|---|---|---|---|
| Lithium-iron-manganese composite oxide A | 1.42 | 19.9 | 60.0 | 20.1 |
| Lithium-iron-manganese composite oxide D | 1.73 | 9.5 | 80.3 | 10.2 |
| Lithium-iron-manganese composite oxide A2 | 1.12 | 19.9 | 60.0 | 20.1 |
| Lithium-iron-manganese composite oxide D2 | 1.66 | 9.5 | 80.3 | 10.2 |

<$^{57}$Fe Moessbauer Spectroscopy>

The chemical state of iron was analyzed by the Moessbauer spectroscopy. The measurement results, from which an Fe component in aluminum laminate was removed, were summarized in Table 4. For each sample, isomer shift δ (IS)[mm/s], the valences of iron ($Fe^{3+}$, $Fe^{5+}$), component ratio (ratio (atom %) of trivalent or pentavalent iron to the total amount of iron) are shown.

From comparison between Table 4 and Non Patent Literature 1 (IS value of $Fe^{3+}$: +0.37 mm/s, IS value of $Fe^{4+}$: +0.06 mm/s, IS value of $Fe^{5+}$: −0.41 mm/s described in Table 4 in the literature), it is found that in lithium-iron-manganese composite oxides A2 and D2 from which Li was detached, not only a trivalent iron but also a pentavalent iron (about 22.3% and about 15.2%, respectively) are produced. In contrast, in lithium-iron-manganese composite oxides A and D, the presence of a pentavalent iron was not confirmed. Note that valence was determined based on the IS value. Since the peak position of IS and the valence of iron are correlated, the valence of iron can be determined based on the value of the peak position of IS.

TABLE 4

| Component | Compo-nent | Component ratio (%) | IS (mms$^{-1}$) |
|---|---|---|---|
| Lithium-iron-manganese composite oxide A | $Fe^{3+}$ | 100 | +0.34 (6) |
| Lithium-iron-manganese composite oxide D | $Fe^{3+}$ | 100 | +0.33 (9) |
| Lithium-iron-manganese composite oxide A2 | $Fe^{3+}$ | 77.7 | +0.30 (0) |
|  | $Fe^{5+}$ | 22.3 | −0.26 (6) |
| Lithium-iron-manganese composite oxide D2 | $Fe^{3+}$ | 84.8 | +0.33 (6) |
|  | $Fe^{5+}$ | 15.2 | −0.24 (2) |

<Determination of Mn and Ni Valences>

Lithium-iron-manganese composite oxides A2 and D2 from which Li was detached were evaluated for Mn and Ni by a transmission method in accordance with the synchrotron radiation X-ray absorption spectroscopy (XAS). The samples were sealed with Kempton tape. In XAS, as valence increases, the peak of absorption spectrum parallelly shifts. The valence of Mn was determined through comparison with Mn (0-valent), MnO (divalent) and $MnO_2$ (tetravalent); whereas the valence of Ni was determined through comparison with Ni (0-valent), NiO (divalent) and $LiNiO_2$ (trivalent). As a result, it was found that Mn is mostly tetravalent and Ni is mostly divalent.

<Measurement of Powder Resistivity>

Resistivity of powders of lithium-iron-manganese composite oxides A, D, A2 and D2 was measured in accordance with the four-terminal method. The color of the powders before the lithium detachment treatment was brown and the color after the detachment treatment was black. The resistivity of powders was measured by adding a powder (1 g) in a mold and applying a constant pressure of about 10 kN. As a result, the resistivity of lithium-iron-manganese composite oxides A and D was $8 \times 10^3$ (Ωcm). In contrast, the resistivity of lithium-iron-manganese composite oxides A2 and D2 was $3 \times 10^3$ (Ωcm). It was found that the resistivity decreases.

In the foregoing, the present invention has been described with reference to the exemplary embodiments and the Examples; however, the present invention is not limited to the exemplary embodiments and the Examples. Various modifications understandable to those skilled in the art may be made to the constitution and details of the present invention within the scope thereof.

This application claims the right of priority based on Japanese Patent Application No. 2017-015472 filed on Jan. 31, 2017 and Japanese Patent Application No. 2017-253731 filed on Dec. 28, 2017, the disclosures of which are incorporated herein in their entirety by reference.

REFERENCE SIGNS LIST

1: Positive-electrode active material layer
1A: Positive electrode current collector
1B: Positive tab
2: Negative-electrode active material layer
2A: Negative electrode current collector
2B: Negative tab
3: Separator
4: Package

What is claimed is:

1. A method for producing a lithium-manganese composite oxide by a wet chemical process using a coprecipitation-baking method, said method comprising:
coprecipitating by adding an aqueous solution containing a divalent Mn salt in combination with a trivalent or higher-valent Mn salt as a Mn source to an alkaline solution to form a precipitate;
subjecting the formed precipitate to a bubbling treatment
mixing a lithium salt with the bubbled precipitate to form a mixture;
drying the mixture and grinding the dried mixture; and
baking the ground mixture and water-washing the baked mixture,
wherein the lithium-manganese composite oxide comprises a lithium-iron-manganese composite oxide represented by the composition formula: $Li_{1+x-w}(Fe_y Ni_z Mn_{1-y-z})_{1-x}O_{2-\delta}$ wherein $0<x<1/3$, $0 \leq w < 0.8$, $0<y<1$, $0<z<0.5$, $y+z<1$, and $0 \leq \delta < 0.5$,
wherein at least in a state of charge of a lithium ion battery comprising the lithium-manganese composite oxide as a positive-electrode active material, at least some of iron atoms are pentavalent.

2. The method for producing a lithium-manganese composite oxide according to claim 1, wherein at least some of iron atoms are pentavalent in states of charge and discharge of the lithium ion battery.

3. The method for producing a lithium-manganese composite oxide according to claim 1, wherein the lithium-iron-manganese composite oxide represented by the composition formula satisfies $0<w<0.8$.

4. The method for producing a lithium-manganese composite oxide according to claim 1, wherein, in the lithium-iron-manganese composite oxide represented by the composition formula, nickel is trivalent or lower-valent and manganese is tetravalent or lower-valent.

5. The method for producing a lithium-manganese composite oxide according to claim 1, comprising detaching Li from a product obtained after the water-washing, by reacting the product with an oxidant.

6. The method for producing a lithium-manganese composite oxide according to claim 2, wherein the lithium-iron-manganese composite oxide represented by the composition formula satisfies $0<w<0.8$.

7. The method for producing a lithium-manganese composite oxide according to claim 2, wherein, in the lithium-iron-manganese composite oxide represented by the composition formula, nickel is trivalent or lower-valent and manganese is tetravalent or lower-valent.

8. The method for producing a lithium-manganese composite oxide according to claim 1, further comprising detaching Li from a product obtained after the water-washing, by reacting the product with bromine as an oxidant.

* * * * *